United States Patent [19]
Pekau

[11] 3,895,341
[45] July 15, 1975

[54] METHOD FOR ABERRATION-FREE OPTICAL REPRODUCTION OF HIGHLY RESOLVED SONAR OR RADAR MAPS

[75] Inventor: Dietlind Pekau, Krailling, Germany

[73] Assignee: Siemens Aktiengesellschaft, Berlin & Munich, Germany

[22] Filed: Mar. 12, 1973

[21] Appl. No.: 342,302

[30] Foreign Application Priority Data
Mar. 23, 1972  Germany............................ 2214005

[52] U.S. Cl. ..................... 343/5 H; 343/17; 350/3.5
[51] Int. Cl. ........................... G01s 9/00; G01s 9/02
[58] Field of Search ............... 343/5, 6, 17; 350/3.5; 340/5 H, 5 I; 129/100.3 G; 178/6.7; 346/108

[56] References Cited
UNITED STATES PATENTS
2,976,362  3/1961  Stamps................................ 350/6
3,519,331  7/1970  Cutrona et al...................... 343/5 R
3,685,051  8/1972  Wells................................. 343/6 R Primary Examiner—Maynard R. Wilbur
Assistant Examiner—N. Moskowitz
Attorney, Agent, or Firm—Hill, Gross, Simpson, Van Santen, Steadman, Chiara & Simpson

[57] ABSTRACT

A method for aberration-free optical recording of highly resolved sonar or radar maps in which a series of one-dimensional holograms is recorded as a function of the receiving time and coherently reconstructed with the help of pulsed sonar or radar. The method is particularly characterized in that a one-dimensional doubling of the transmission function of the holograms is effected through the use of a filter within the beam path to thereby simultaneously reconstruct the entire sonar or radar map in such a way that both the image distance and the image size are independent from distance.

7 Claims, 2 Drawing Figures

METHOD FOR ABERRATION-FREE OPTICAL REPRODUCTION OF HIGHLY RESOLVED SONAR OR RADAR MAPS

BACKGROUND OF THE INVENTION

1. Field of the Invention

This invention relates to a method for aberration-free optical reproduction of highly resolved sonar or radar maps wherein a series of one-dimensional holograms are recorded as a function of the receiving time through the use of pulsed sonar or radar, and are coherently optically reconstructed.

2. Description of the Prior Art

Highly resolved images can be obtained by means of ultrasonic through the use of a sonar method, in particular a side-looking or lateral-view sonar method. For this purpose, a succession of sonar pulses is transmitted by a vehicle such as a ship. The echoes of the targets impinged by the radiation are received by sound transducers arranged parallel to the direction of travel of the vehicle. After a reference signal, which is coherent with respect to the transmitter, has been superimposed, the signals are recorded in such a way that the receiving time is recorded in one coordinate direction while the object coordinate is contained parallel to the vehicle direction in the form of one-dimensional holograms which are aligned with respect to phase. The same principle is also true in connection with other methods, such as high-frequency electromagnetic waves as may be applied in a radar technique.

Highly resolved radar or sonar maps can be produced by means of coherent-optical reconstruction of such one-dimensional holograms and the subsequent recording of the object images produced thereby. Since, however, the image distance depends upon the object distance during the reproduction of holograms, the two object coordinates, distance and aximuth, are focused in different planes, so that a conical lens as well as a cylindrical lens are required for recordation of the image. As soon as the ratio of image distance to object distance reaches the order of magnitude of unity, the required conical lens cannot be realized without great abberation.

In addition to the foregoing, strong image distortions will occur with such a recordation due to the distance-dependent object enlargements. It is true that the film upon which one-dimensional radar holograms are recorded can be moved along the conical lens at a constant speed in the case of side-view radar for correction of these image distortions, and the radar map can be recorded simultaneously, line by line upon a film which is also moved along behind a slot at a constant speed. However, this method has the drawback that the radar map is recorded line by line so that the radar image can only be viewed after the holograms have been completely moved along the conical lens and the film carrying the image has been developed. Furthermore, undesired diffraction effects are introduced due to the application of a slot, which effects degrade resolution.

In order to obtain distance-independent image enlargements and image distances when highly resolved sonar or radar maps are optically reproduced, it was suggested in my U.S. patent application Ser. No. 148,268, filed Apr. 7, 1971 now U.S. Pat. No. 3,805,222 to select a hologram enlargement for the recording of the sonar or radar maps which is inversely proportional to the object distance. This method, however, demands an increased resolution requirement of the electro-optical converter recording the holograms.

SUMMARY OF THE INVENTION

The object of the present invention is to provide a method for aberration-free optical recording of highly resolved sonar or radar maps of the initially-mentioned kind which permits recording of the entire sonar or radar map completely and without distortion, without delay, and without making increased demands of the resolution of the electro-optical converter during the recording of the one-dimensional holograms.

According to the invention, a one-dimensional cross correlation of the transmission function of the holograms is effected through the use of an adapted filter in the beam path which will cause the entire sonar or radar map to be simultaneously recorded in such a way that both the image distance and the image size are independent from distance.

The adapted filter whose phase transmission corresponds to the Fourier transform function or the phase transmission of a conical lens is preferably located in the Fourier transformation plane of the azimuth coordinate of the one-dimensional sonar or radar holograms.

Advantageously, the distance coordinates of the one-dimensional sonar or radar holgrams is recorded through the use of further optical elements in the filter plane and then recorded in the image plane.

Preferably, the filter coodinate will be Fourier transformed with the help of the further optical elements, parallel to the azimuth coordinates of the one-dimensional sonar or radar holograms.

It is particularly favorable to utilize either a kinoform or a phase or an amplitude hologram. A kinoform is a phase plate produced by a computer which stores calculated object-wave fronts of constant amplitude and reconstructs with a high degree of efficiency. As opposed to holograms, which also store the amplitude of a wave front, a kinoform will only produce wave fronts of constant amplitudes, as this is the case, for example in Fresnel or farfield of a light dot source matrix having statistically varying phases. A further description can be found in the publication "IBM Journal of Research and Development," March 1969, Pages 150 through 155.

The method according to the present invention has the advantage that the sonar or radar map is completely recorded without distortion in a simple manner and without delay, and can be projected, if required, for example upon a screen. For example, the image of an area at the instant of flying above the area can be viewed when the holograms are recorded upon photochromic material instead of upon a film, so that no photographic development is required, or an electro-optical converter, such as a photochromic oscillograph is provided for the direct amplitude or phase modulation of the light, corresponding to the holographic signal.

BRIEF DESCRIPTION OF THE DRAWINGS

Other objects, features and advantages of the invention, its organization, construction and operation will be best understood from the following detailed description of preferred embodiment thereof taken in conjunction with the accompanying drawings, on which.

DESCRIPTION OF THE PREFERRED EMBODIMENTS

If sonar or radar holograms are illuminated with a plane reproducing wave, and are thereby pulled along a conical lens, a line of one-dimensional cross correlation of the transmission of the holograms with the phase transmission of the conical lens, as can be shown with the help of the Fresnel defraction theory, will be produced in the focal plane of a further spherical lens. By means of a cross correlation of the hologram transmission with the phase transmission of a conical lens, the amplitude distribution of the object field is reconstructed. The image enlargement, as well as the image distance, are thereby independent from the object distance and the ratio of the recording and reconstruction wave lengths.

With an arrangement whereby the holograms are pulled along the conical lens, merely one line of this cross correlation will be produced for each hologram, so that the sonar or radar map can only be recorded line by line. Furthermore, the remaining interference light in the focal plane must be screened out, with the exception of the desired line.

This cross correlation can also be carried out with the help of a suitable adapted filter which is placed into the Fourier transformation plane of holograms, and therefore the sonar or radar maps can be reconstructed without distortion in real time.

The phase transmission of the adapted filter must thereby be equal to the Fourier transform function of that of a conical lens. Since the Fourier transform function of the product of two functions is equal to the convolution of the Fourier transform function of these functions, the entire sonar or radar map will be reconstructed without distortion in the focal plane.

It can be shown with the help of the Fresnal defraction theory that the Fourier transform function of the phase transmission of a conical lens results in the transmission of a hyperbolic lens whose focal length $F_H$ is given by the following equation:

$$F_H = -F_3^2 F_K$$

where $F_K = m^2 \ g/\lambda g$ the focal length of the conical lens, $F_3$ is the focal length of the lens employed for the Fourier transformation, $\lambda$ is the wave length utilized for the reconstruction, m is the hologram decrease in size and g is the object distance.

Therefore, the following is true for the transmission of the adapted filter:

$$T_1(q,r) = \exp\ ik\ \Lambda m^2 m_q^{-1}\ qr^2/2\lambda F_3^2$$

where $q$ and $r$ are the coordinates of the Fourier transformation plane, $q = m_s\ g$, $m_s$ are the decrease in size of the distance coordinates in this plane and $\Lambda$ is the sonar or radar wave length.

Figure 1:
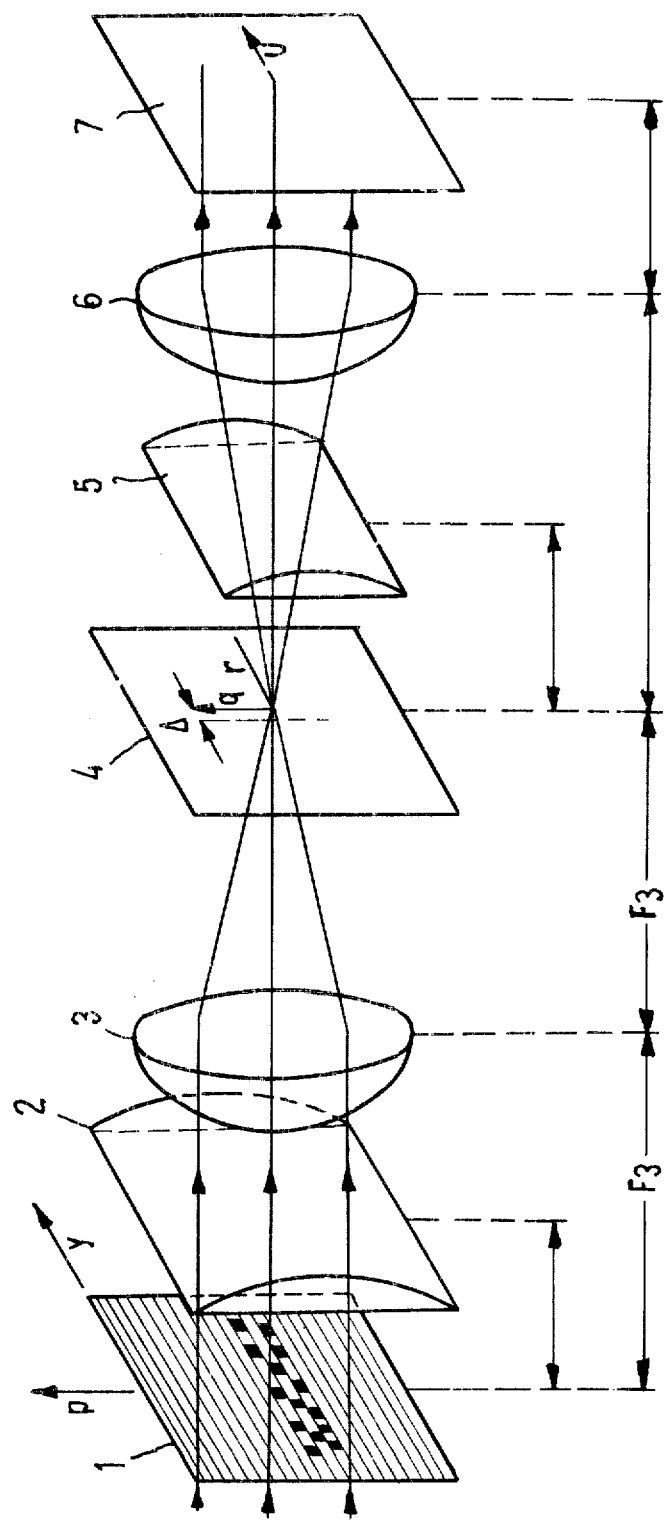
FIG. 1 is a schematic diagram of an arrangement for reconstruction of sonar or radar maps by means of adapted filtering according to the principles of the present invention.

FIG. 1 schematically illustrates an arrangement for reconstructing sonar or radar maps by means of adapted filtering. The holograms 1 are illuminated by a plane coherent wave incident in the direction of the arrows from left to right, and the distance coordinates p is recorded with the help of a cylindrical lens 2 and a spherical lens 3 in the focal plane of the lens 3. An adapted filter 4 is positioned in the focal plane of the lens 3. The hologram transmission is Fourier transformed with the help of the spherical lens 3 parallel to the azimuth coordinate $x$. The $r$ coordinate again is Fourier transformed by means of a further spherical lens 6 so that the one-dimensional cross correlation of the transmission function of the holograms 1 is produced in the image plane 7 with the phase transmission of a conical lens. The distance coordinate q is focused in the image plane 7 of the sonar or radar map, with the help of a cylindrical lens 5 positioned between the adapted filter 4 and the spherical lens 6.

Generally, a reference wave is employed for recording sonar or radar holograms and is introduced at an angle $\theta$ with respect to the hologram normal. In this case, the adapted filter 4 is shifted by an amount $\Delta$ parallel to the r coordinate during the reconstruction by means of adapted filtering, since otherwise each image line would be shifted by an amount proportional to the object distance, although the image enlargement would be independent from distance.

The shift $\Delta$ of the adapted filter 4 must be equal to the displacement of the Fourier transform function of the hologram image information which is introduced by the angle $\theta$:

$$\Delta = \pm F_3 \lambda \sin\theta / \Lambda m$$

where the negative sign holds true for the conjugated image.

Figure 2:
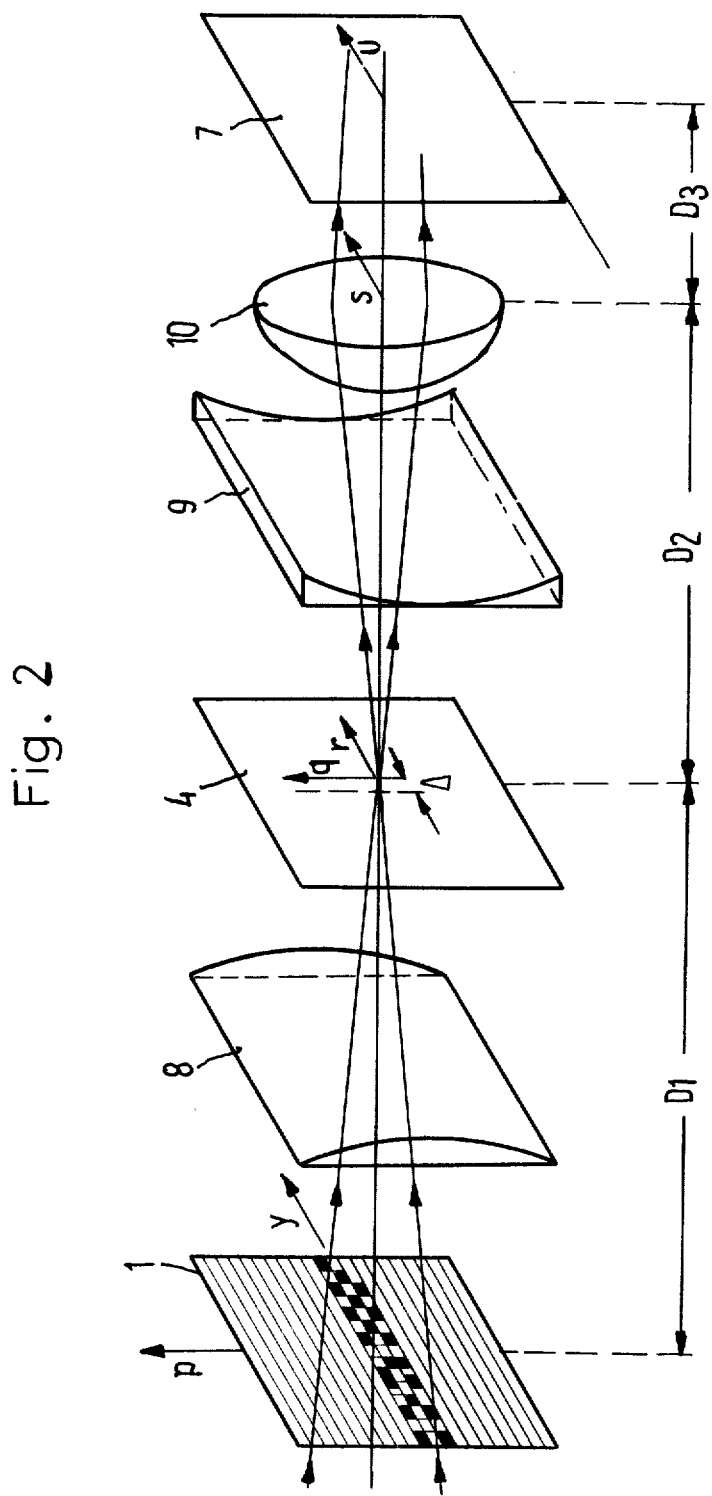
FIG. 2 is a schematic diagram of an arrangement with the help of which sonar or radar maps can be constructed by means of lensfree Fourier transformation according to the invention.

FIG. 2 schematically illustrates an arrangement by which sonar or radar maps can be reconstructed by a lens-free Fourier transformation technique. The holograms are, in this case, illuminated by a convergent laser beam incident from left to right in the drawing in the direction of the arrows and having a bending radius $D_1$. The distance coordinate q is focused by a cylindrical lens 8 disposed in the Fourier transformation plane $(q, r)$. An adapted filter 4 is positioned in the Fourier transformation plane. Since squared phase components are produced in the r direction with such a transformation, they must be equalized, either by means of phase changed transmission of the filter, to wit $$T_2(q,r) = \exp\ ik\ \left[\frac{m^2 \Lambda g r^2}{2\lambda D_1^2} - \frac{r^2}{2D_1}\right]$$

or by means of a spherical lens 10. In the case illustrated in FIG. 2, the following conditions must be fulfilled:

$$1/(D_1+D_2) + 1/D_3 = 1/F_{10}$$

and $$T_3(q,r) = \exp\ ik\ [m^2 \Lambda g r^2/2\lambda D_1^2].$$

$F_{10}$ is the focal length of the spherical lens 10. $T_3(q,r)$ is the phase transmission of the adapted filter 4. $T_1$ is the distance between the hologram plane and the Fourier transformation plane. $D_2$ is the distance between the Fourier transformation plane and the spherical lens 10. $D_3$ is the distance between the spherical lens 10 and the image plane 7. Furthermore, the coordinate q must, in this case, be recorded with the help of a cylindrical lens 9, behind the hologram plane, so that it is focused into the image plane 7.

In this case the adapted filter 4 would also have to be displaced by an amount $\Delta$ when a reference wave was employed and introduced at an angle $\theta$ with respect to the hologram normal during the recordation of the sonar or radar holograms 1. The displacement $\Delta$ is therefore given by the following equation:

$$\Delta = \pm D_1 \lambda \sin\theta / \Lambda m.$$

In both cases illustrated in FIGS. 1 and 2, the entire sonar radar map is illustrated without distortion in the image plane 7. The image size and the image distance are therefore not only independent from the object distance, but furthermore independent from the ratio of the recording wave length to the reconstruction wave length.

As mentioned above, the adapted filter can either be a kinoform or a phase hologram or an amplitude hologram.

A one-dimensional hologram of a focused laser beam is recorded for the production of the adapted filter for each object distance in such a way that the sum of the phases of the amplitude of the laser beam and the conjugated amplitude of the reference beam results in the phase of the desired filter transmission $T$, with the exception of a term depending on the angle of incidence of the reference beam.

Although I have described my invention by reference to specific illustative structures for practicing the invention, many changes and modifications of my invention may become apparent to those skilled in the art without departing from the spirit and scope thereof. I therefore intend to include within the patent warranted hereon all such changes and modifications as may reasonably and properly be included within the scope of my contribution to the art.

I claim:

1. A method of coherently reconstructing one-dimensional holograms with pulse sonar, or radar, the holograms being individual portions of a map, comprising the steps of illuminating a one-dimensional hologram with a plane coherent wave to produce hologram transmission along a beam path, filtering the hologram transmission to effect a one-dimensional cross correlation of the transmission function thereof within the beam path and simultaneously reconstructing the entire map from the one-dimensional holograms whereby image distance and image enlargement are independent of distance.

2. A method according to claim 1, wherein the step of filtering is further defined as filtering with an adapted filter whose phase transmission corresponds to a Fourier transform function of the phase transmission of a conical lens in the Fourier transformation plane of the azimuth coordinate of the one-dimensional holograms.

3. A method according to claim 1, comprising the step of recording the distance coordinates of the holograms in the filter plane with further optical elements and recording the holograms in the image plane.

4. A method according to claim 3, wherein the Fourier transformation is further defined as transforming the filter coordinate with a Fourier transformation parallel to the azimuth coordinates of the hologram with said further optical elements.

5. A method according to claim 1, wherein the method of filtering is further defined as kinoform filtering.

6. A method according to claim 1, wherein the step of filtering is further defined as holographically phase filtering.

7. A method according to claim 1, wherein the step of filtering is further defined as holographically amplitude filtering.

* * * * *